US008659228B2

(12) United States Patent
Woods et al.

(10) Patent No.: US 8,659,228 B2
(45) Date of Patent: Feb. 25, 2014

(54) LED BALLAST MOUNT

(76) Inventors: Thomas Woods, Huntington Beach, CA (US); Brian Wald, Los Angeles, CA (US); Kevin Yang, Lomita, CA (US); Fengchang Hu, Torrance, CA (US)

( * ) Notice: Subject to any disclaimer, the term of this patent is extended or adjusted under 35 U.S.C. 154(b) by 379 days.

(21) Appl. No.: 13/217,614

(22) Filed: Aug. 25, 2011

(65) Prior Publication Data

US 2012/0319583 A1   Dec. 20, 2012

Related U.S. Application Data

(63) Continuation-in-part of application No. 13/160,267, filed on Jun. 14, 2011.

(51) Int. Cl.
*H05B 37/00* (2006.01)
(52) U.S. Cl.
USPC .......................................... 315/56; 315/312

(58) Field of Classification Search
USPC .............. 315/291, 307, 308, 246, 209 R, 312
See application file for complete search history.

(56) References Cited

U.S. PATENT DOCUMENTS 8,247,985 B2 *   8/2012   Timmermans et al. ........ 315/246
8,319,433 B2 *  11/2012   Lin et al. ......................... 315/77

* cited by examiner

*Primary Examiner* — David H Vu
(74) *Attorney, Agent, or Firm* — Clement Cheng

(57) ABSTRACT

An LED ballast mount preferably includes a housing assembly having sidewalls including a housing LED side wall and a housing opposite side wall. A rechargeable battery is installed in a battery assembly and the battery assembly includes a battery housing mounted to the housing LED side wall. A first LED lamp is mounted on a lower face of the battery housing. A first fluorescent lamp socket mounted on a ballast socket face of the battery housing. A second fluorescent lamp socket mounted on the ballast socket face of the battery housing. A bridge housing including an electronic ballast mounted within the bridge housing. Fluorescent tubes may be mounted in the device.

12 Claims, 3 Drawing Sheets

LED BALLAST MOUNT

This application is a continuation in part of quick installation ballast U.S. patent Ser. No. 13/160,267 filed Jun. 14, 2011, the disclosure of which is incorporated herein by reference.

BACKGROUND OF THE INVENTION

A. Field of the Invention

The present invention relates to florescent ballast.

B. Description of the Prior Art

Traditionally, florescent lighting fixtures have had ballast internally mounted. A variety of ballast fixtures have been introduced on a variety of different designs. LED had been added to fluorescent lamps for backup lighting. For example in Bolta United States patent publication 2009/0039793 published Feb. 12, 2009, the disclosure of which is incorporated herein by reference a switchable compact fluorescent lamp with LED is added to the center of the top of the compact fluorescent lamp plastic electronic encasement housing. When a user screws in the bulb and the bulb powers off, the LED light lights up with the florescent or turns off when the florescent is on or can be used as a backup lighting case the florescent bulb does not receive power.

SUMMARY OF THE INVENTION

An LED ballast mount preferably includes a housing assembly having sidewalls including a housing LED side wall and a housing opposite side wall. A rechargeable battery is installed in a battery assembly and the battery assembly includes a battery housing mounted to the housing LED side wall. A first LED lamp is mounted on a lower face of the battery housing. A first fluorescent lamp socket mounted on a ballast socket face of the battery housing. A second fluorescent lamp socket mounted on the ballast socket face of the battery housing. A bridge housing including an electronic ballast mounted within the bridge housing.

A rechargeable battery cell is housed within the battery assembly charged by a DC output from the fluorescent ballast. A reflector assembly is mounted within the housing assembly between the housing LED side wall and the housing opposite side wall. A reflector peak is formed on the reflector assembly, and the reflector peak is formed between a pair of reflector concaves. A test button is formed on the battery assembly, and the test button momentarily activates the LED for testing the battery. The bridge housing first notch is formed on the bridge housing, and a bridge housing second notch is formed on the bridge housing. The bridge housing is mounted on the housing opposite side wall at the bridge housing first notch and the bridge housing second notch. Fluorescent tube contacts are formed on a third fluorescent lamp socket and a fourth fluorescent lamp socket. The third socket in the fourth socket is mounted on the bridge housing aligned to the first fluorescent lamp socket and the second fluorescent lamp socket.

BRIEF DESCRIPTION OF THE DRAWINGS

Similar reference numbers denote corresponding features throughout the attached drawings. The following call a list of elements can be a useful guide in referencing the elements of the drawings.

Figure 1:
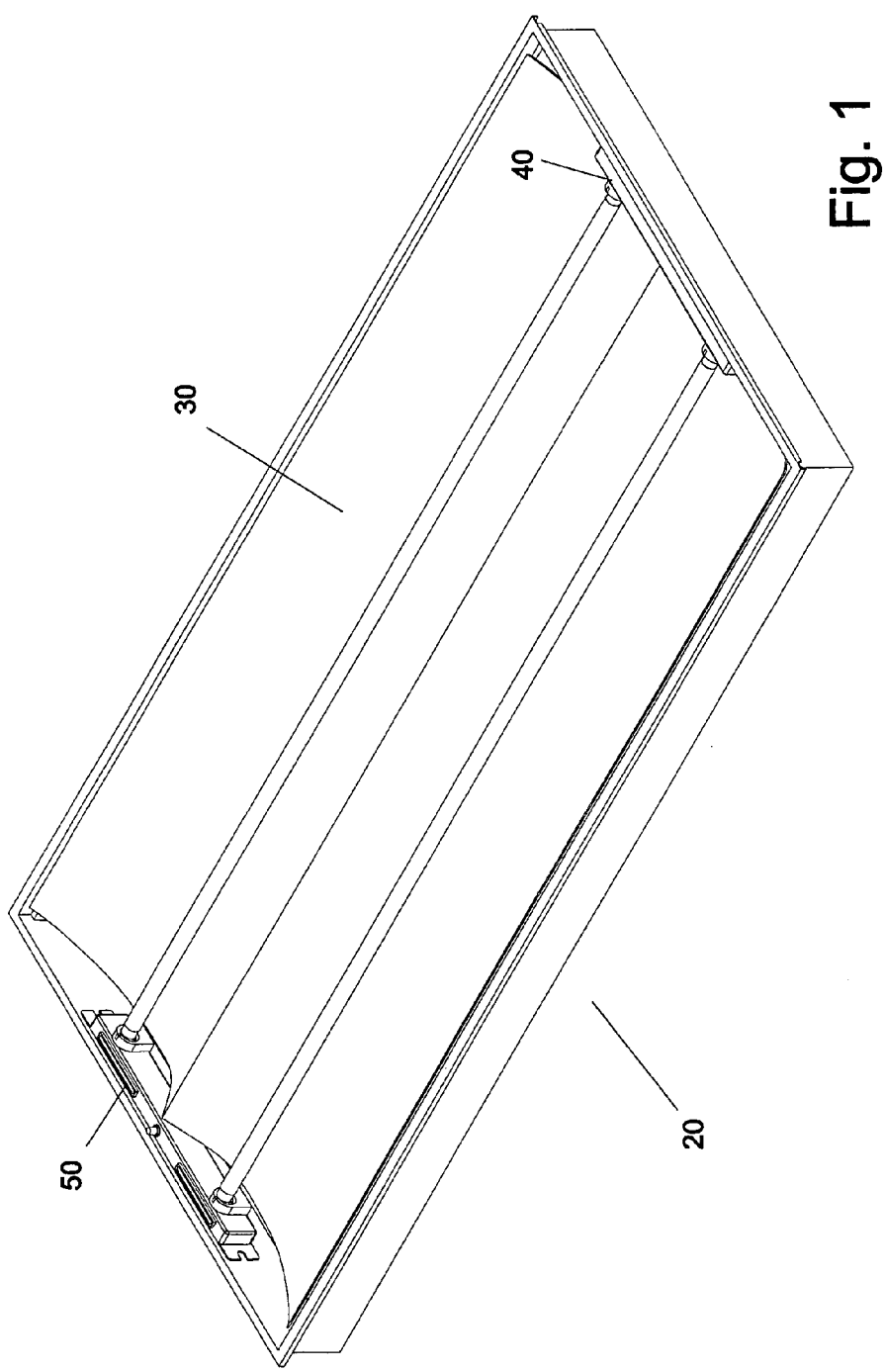
FIG. 1 is a bottom perspective view of the present invention, as a viewer would see a fixture mounted to a ceiling if the viewer were looking upward.
Figure 2:
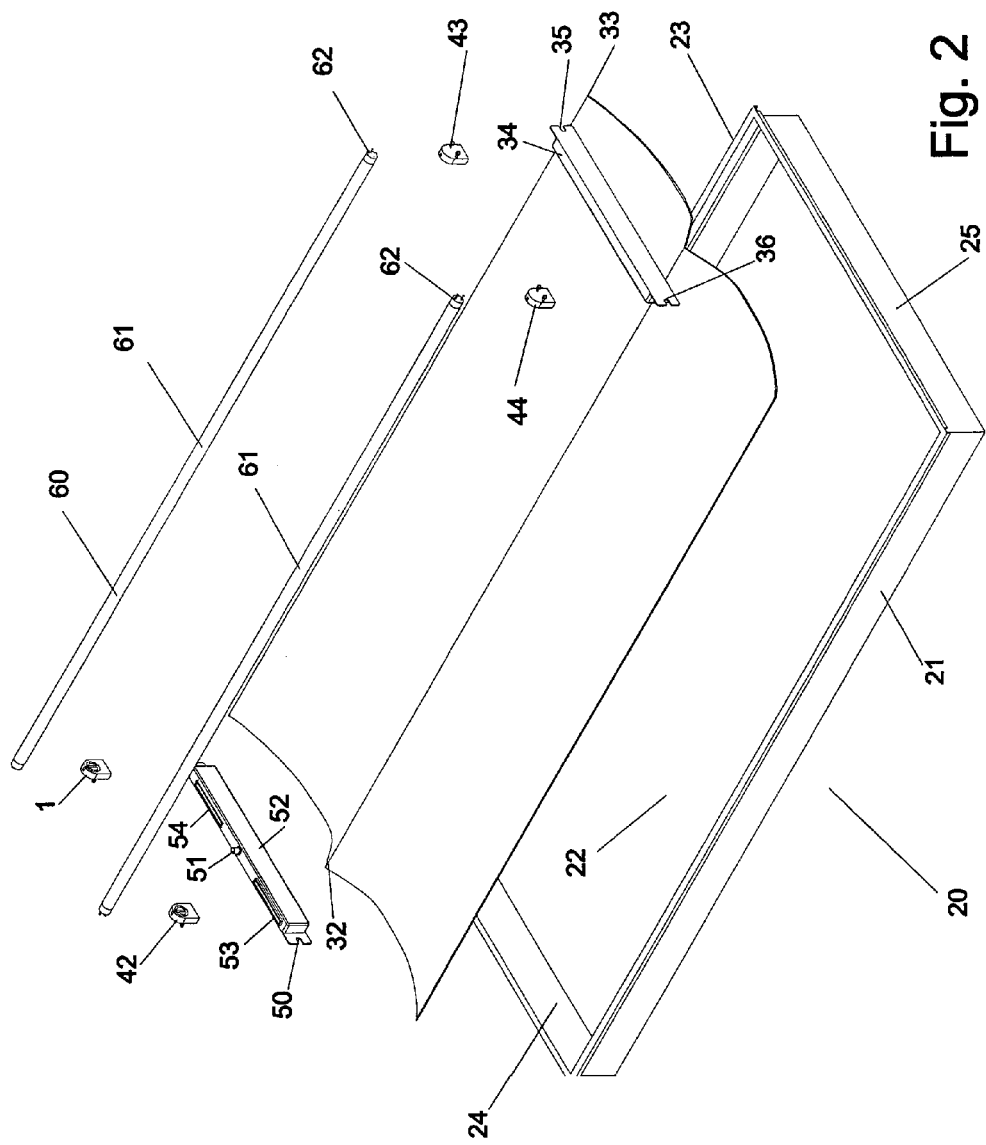
FIG. 2 is an exploded view of the present invention.
Figure 3:
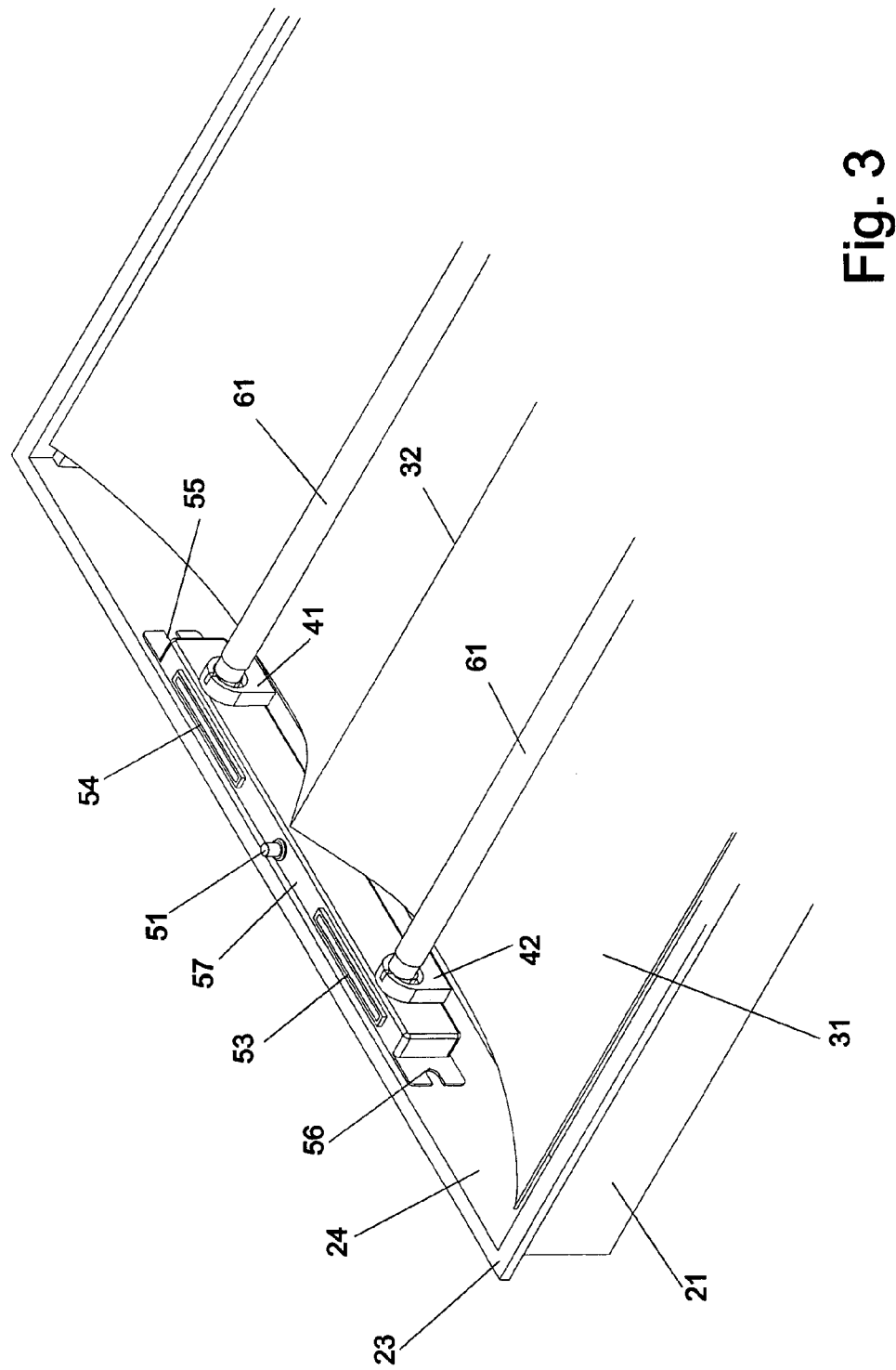
FIG. 3 is a bottom close-up view of the present invention.

20 Housing Assembly
21 Housing
22 Housing Top
23 Housing Rim
24 Housing Led Side Wall
25 Housing Opposite Side Wall
30 Reflector Assembly
31 Reflector Concave
32 Reflector Peak
33 Reflector Edge
34 Bridge Housing
35 Bridge Housing First Notch
36 Bridge Housing Second Notch
40 Socket Assembly
41 First Socket
42 Second Socket
43 Third Socket
44 Fourth Socket
50 Battery Assembly
51 Test Button
52 Ballast Socket Face
53 First Led Lamp
54 Second Led Lamp
60 Tube Assembly
61 Fluorescent Tube
62 Florescent Tube Contacts

DETAILED DESCRIPTION OF THE PREFERRED EMBODIMENT

The present invention includes a fixture having a housing assembly 20 enclosing a reflector assembly 30. A socket assembly 40 is mounted to the housing assembly 20 and a battery assembly 50 has LED arrays for emergency or supplemental lighting.

The housing assembly 20 includes a housing 21 typically formed of a folded metal sheet. The housing 21 includes a housing top 22 and a housing rim 23 defining a bottom of a plurality of side wall around the housing top 22. The housing forms a cavity for receiving a reflector assembly 30 which is typically rectangular shaped. The housing includes a housing LED side wall 24 and a housing opposite side wall 25. The housing LED side wall 24 is preferably formed at a shorter side and the housing opposite side wall 25 is preferably also formed at a shorter side. Between the shorter sides, are longer sidewalls.

The reflector assembly 30 includes a reflector concave 31 that can be made parabolic for directing light downward. A reflector peak 32 provides a midpoint for dividing a left and a right section of the reflector assembly 30 so that a pair of reflector concaves 31 can be formed.

Each pair of reflector concaves 31 provides a channel for directing light from a fluorescent tube lamp 61. The reflector edge 33 may lodge within a fold of the housing rim 23 at a side wall, and the reflector edge 33 could abut the bridge housing 34 or the ballast socket face 52 and be retained between the bridge housing and ballast socket face. The bridge housing 34 may further include an electronic florescent ballast circuitry for outputting power at a third socket 43 and at a fourth socket 44. Alternatively, the bridge housing 34 could merely electrically connect the third socket 43 in electrical series with the fourth socket 44. The bridge housing 34 has a plurality of notches including a bridge housing first notch 35 and a bridge housing second notch 36.

The socket assembly 40 includes a plurality of electrical connectors including a first socket 41, a second socket 22, a third socket 43, and a fourth socket 44. The third socket 43 and fourth socket 44 are mounted on an inside face of the bridge housing 34. Similarly, the first socket 41 and the second socket 42 are preferably mounted on a ballast socket face 52 of the battery assembly 50. The ballast socket face 52 is elongated and flat to receive the first socket and the second socket. The first socket and the second socket both have a flat back face for flat mounting to the ballast socket face 52.

A first LED lamp 53 and a second LED lamp 54 can be mounted on a lower face of the battery assembly. The lower face of the battery assembly is elongated in the direction of the housing LED side wall 24. The first LED lamp 53 and the second LED lamp 54 can be formed of a plurality of individual elements, or can be formed as an array of a first LED array 53 and a second LED array 54, be formed of a single LED chip element each which passes through a prismatic lens for diffusion. The first LED lamp and the second LED lamp may have an elongated rectangular lens covering the single or multiple chip lamp.

The first LED lamp and the second LED lamp are mounted to a surface of the ballast housing. The ballast housing is typically made of a folded metal sheet folded into a metal box. The ballast housing and bridge housing are mounted to the sidewalls. The tube assembly 60 includes a pair of fluorescent tubes 61 having fluorescent tube contacts 62 extending into sockets of the socket assembly 40. The socket assembly may include a fluorescent lamp ballast mounted within the socket assembly.

A test button 51 can be pressed for testing the function of the first LED lamps 53 and the second LED lamps 54. The battery assembly 50 further includes a rechargeable battery cell mounted within the battery assembly. A rechargeable battery cell such as a lithium-ion or nickel cadmium rechargeable battery or an ultra capacitor receives DC power during normal use. The DC power charges the battery during normal use. When AC power is lost, the battery provides power to the first LED lamps 53 and the second LED lamps 54. Therefore, in ordinary operation, the pair of LED lamps is off and the battery is charging. The ballast circuitry for driving the fluorescent lamps can be mounted within the bridge housing 34 while the battery assembly 50 receives the battery and power off sensing circuit.

A variety of modifications to the present invention can be implemented. Therefore, while the presently preferred form has been shown and described, it is to be understood that the present invention is not limited to the sole embodiment described above, but encompasses any and all embodiments within the scope of the following claims.

The invention claimed is:

1. An LED ballast mount comprising:
    a. a housing assembly having sidewalls including a housing LED side wall and a housing opposite side wall;
    b. a battery installed in a battery assembly, wherein the battery assembly includes a battery housing mounted to the housing LED side wall;
    c. a first LED lamp mounted on a lower face of the battery housing; and
    d. a first fluorescent lamp socket mounted on a ballast socket face of the battery housing, and a second fluorescent lamp socket mounted on the ballast socket face of the battery housing; and
    e. a bridge housing including an electronic ballast mounted within the bridge housing.

2. The LED ballast mount of claim 1, further comprising: a rechargeable battery cell housed within the battery assembly charged by a DC output from the fluorescent ballast.

3. The LED ballast mount of claim 1, further comprising: a reflector assembly mounted within the housing assembly between the housing LED side wall and the housing opposite side wall.

4. The LED ballast mount of claim 3, further comprising: a reflector peak formed on the reflector assembly, wherein the reflector peak is formed between a pair of reflector concaves.

5. The LED ballast mount of claim 1, further comprising: a test button formed on the battery assembly, wherein the test button momentarily activates the LED for testing the battery.

6. The LED ballast mount of claim 1, further comprising: a bridge housing first notch formed on the bridge housing, and further comprising a bridge housing second notch formed on the bridge housing, wherein the bridge housing is mounted on the housing opposite side wall at the bridge housing first notch and the bridge housing second notch.

7. The LED ballast mount of claim 1, further comprising: fluorescent tube contacts formed on a third fluorescent lamp socket and a fourth fluorescent lamp socket, wherein the third socket in the fourth socket are mounted on the bridge housing aligned to the first fluorescent lamp socket and the second fluorescent lamp socket.

8. The LED ballast mount of claim 7, further comprising: a rechargeable battery cell housed within the battery assembly charged by a DC output from the fluorescent ballast.

9. The LED ballast mount of claim 7, further comprising: a reflector assembly mounted within the housing assembly between the housing LED side wall and the housing opposite side wall.

10. The LED ballast mount of claim 9, further comprising: a reflector peak formed on the reflector assembly, wherein the reflector peak is formed between a pair of reflector concaves.

11. The LED ballast mount of claim 7, further comprising: a test button formed on the battery assembly, wherein the test button momentarily activates the LED for testing the battery.

12. The LED ballast mount of claim 7, further comprising: a bridge housing first notch formed on the bridge housing, and further comprising a bridge housing second notch formed on the bridge housing, wherein the bridge housing is mounted on the housing opposite side wall at the bridge housing first notch and the bridge housing second notch.

\* \* \* \* \*